United States Patent
Eisenhardt et al.

(10) Patent No.: US 7,134,516 B2
(45) Date of Patent: Nov. 14, 2006

(54) METHOD FOR SETTING A DESIRED OPERATING CONDITION OF A HYBRID DRIVE FOR A VEHICLE

(75) Inventors: Martin Eisenhardt, Renningen (DE); Dieter Hoetzer, Markgröningen (DE); Stefan Tumback, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 10/502,199

(22) PCT Filed: Sep. 7, 2002

(86) PCT No.: PCT/DE02/03343

§ 371 (c)(1),
(2), (4) Date: Jul. 21, 2004

(87) PCT Pub. No.: WO03/062009

PCT Pub. Date: Jul. 31, 2003

(65) Prior Publication Data
US 2005/0072609 A1    Apr. 7, 2005

(30) Foreign Application Priority Data
Jan. 25, 2002    (DE) .............................. 102 03 760.4

(51) Int. Cl.
*B60K 1/00*    (2006.01)
(52) U.S. Cl. .................. 180/65.2; 180/65.3; 180/65.4; 903/942; 903/943
(58) Field of Classification Search .............. 180/65.2, 180/65.3, 65.4; 903/942, 943
See application file for complete search history.

(56) References Cited

U.S. PATENT DOCUMENTS

| | | | |
|---|---|---|---|
| 3,566,717 A | | 3/1971 | Richardson et al. |
| 6,300,735 B1* | | 10/2001 | Stemler ..................... 318/433 |
| 6,338,391 B1* | | 1/2002 | Severinsky et al. ........ 180/65.2 |
| 6,811,508 B1* | | 11/2004 | Tumback ....................... 475/5 |
| 2002/0189397 A1* | | 12/2002 | Sakamoto et al. ............ 74/661 |

FOREIGN PATENT DOCUMENTS

| | | |
|---|---|---|
| DE | 197 37 871 | 3/1999 |
| DE | 100 21 025 | 11/2001 |
| DE | 101 10 965 | 12/2001 |
| FR | 2 783 763 | 3/2000 |
| FR | 2 799 163 | 4/2001 |

* cited by examiner

*Primary Examiner*—J. Allen Shriver
*Assistant Examiner*—Cynthia F. Collado
(74) *Attorney, Agent, or Firm*—Kenyon & Kenyon LLP

(57) ABSTRACT

A method is described for adjusting a setpoint operating state of a hybrid drive in a motor vehicle, the hybrid drive including an internal combustion engine and at least two electric motors as the drive motors, and the output shafts of the drive motor being capable of being operatively connected to a drive train of the vehicle, a setpoint operating point of the hybrid drive being adjusted as a function of an instantaneous power demand (output torque) on the hybrid drive and an instantaneous electrical power demand of an electrical system of the vehicle, by determining the speeds and the torques of the drive motors.

At least one of the electric motors (16) is controlled by voltage regulation and the other electric motor(s) (14) is/are controlled by speed regulation.

3 Claims, 2 Drawing Sheets

METHOD FOR SETTING A DESIRED OPERATING CONDITION OF A HYBRID DRIVE FOR A VEHICLE

The present invention relates to a method for adjusting a setpoint operating state of a hybrid drive in a vehicle, the hybrid drive including an internal combustion engine and at least two electric motors as the drive motors, and the output shafts of the drive motors being capable of being operatively connected to a drive train of the vehicle.

BACKGROUND INFORMATION

Hybrid drives for vehicles are known. In the case of the hybrid drives discussed here, an internal combustion engine is combined with two electric motors, so that a plurality of drive sources is available to the vehicle. In accordance with demands specified by a vehicle driver, the drive sources can selectively supply their input torques to a drive train of the vehicle. In a manner that is known per se, this results in different possible drive configurations depending on actual driving situations, the drive configurations serving in particular to enhance driving comfort and reduce energy use while reducing pollutant emissions.

In the case of hybrid drives for vehicles, serial configurations, parallel configurations and mixed configurations of internal combustion engine and electric motors are known. Depending on the configuration, the electric motors are capable of being engaged directly or indirectly in the drive train of the internal combustion engine. To operatively connect the internal combustion engine and/or the electric motors, it is known to position them in such a manner that they are capable of being operatively connected to each other via gearing, e.g., planetary gearing or the like, and clutches.

To permit optimum implementation of a driver's request for drive power from the hybrid drive, a coordinated actuation of the drive motors of the hybrid drive is required, which takes place in known fashion using an "engine control unit." The actuation of the drive motors can take place based on a setpoint operating state (optimum operating point) of the hybrid drive to be determined by the engine control unit.

It is known that, to determine the setpoint operating state, the required power of the internal combustion engine, the required speed of a first electric motor and the required torque of a second electric motor must be determined based on a power demand on the hybrid drive, corresponding to a vehicle driver's desired torque, and based on an instantaneous electrical power demand of an electrical system of the vehicle. These determined variables are sent to the drive motors as setpoint variables. It is disadvantageous here that the torque of the second electric motor cannot be adjusted with sufficient accuracy. This instantaneous torque of the electric motor must therefore be estimated based on a measured phase current, for example. Due to this inexact estimation, the adjustment of the torque of the second electric motor is faulty; as a result, the instantaneous output torque of the hybrid drive and the instantaneous power output of the vehicle electrical system deviate from their setpoint values. While the deviation of the output torque can be compensated for by a vehicle driver (by operating the accelerator pedal or the like), the deviation of the output of the vehicle electrical system can only be detected and regulated indirectly. The vehicle system voltage is adjusted by a higher-order controller, which is only capable of operating slowly due to a high capacity of a vehicle battery that is used. This regulation of the vehicle system voltage results in deviations of the instantaneous vehicle system output, making it necessary to correct the setpoint operating point of the hybrid drive.

ADVANTAGES OF THE INVENTION

In contrast, the method according to the present invention having the features stated in Claim 1 offers the advantage of enabling faster and easier adjustment of the setpoint operating point of the hybrid drive. Due to the fact that one of the electric motors is controlled by voltage regulation and the other electric motor is controlled by speed regulation, it advantageously becomes possible to integrate the regulation of the vehicle system voltage directly into the adjustment of the setpoint operating point of the hybrid drive. This enables rapid and exact regulation of the vehicle system voltage. Since the vehicle system voltage is directly coupled to battery output, the battery output may be determined directly by performing a simple voltage measurement at the electric motor. As a result, by regulating the voltage on the electric motor, a simple regulation of the charging and/or discharging capacity of the battery is possible. In turn, this brings about the rapid and exact adjustment of the setpoint operating point of the hybrid drive. This further results in the advantage that a load on the vehicle battery is reduced via the heretofore common regulation of the vehicle system voltage by a higher-order controller, so that the useful life of the vehicle battery is extended.

Further preferred embodiments of the present invention result from the features stated in the subclaims.

DRAWINGS

The present invention is explained in greater detail hereinbelow in an exemplary embodiment, with reference to the attached drawing.

DESCRIPTION OF THE EXEMPLARY EMBODIMENT

Figure 1:
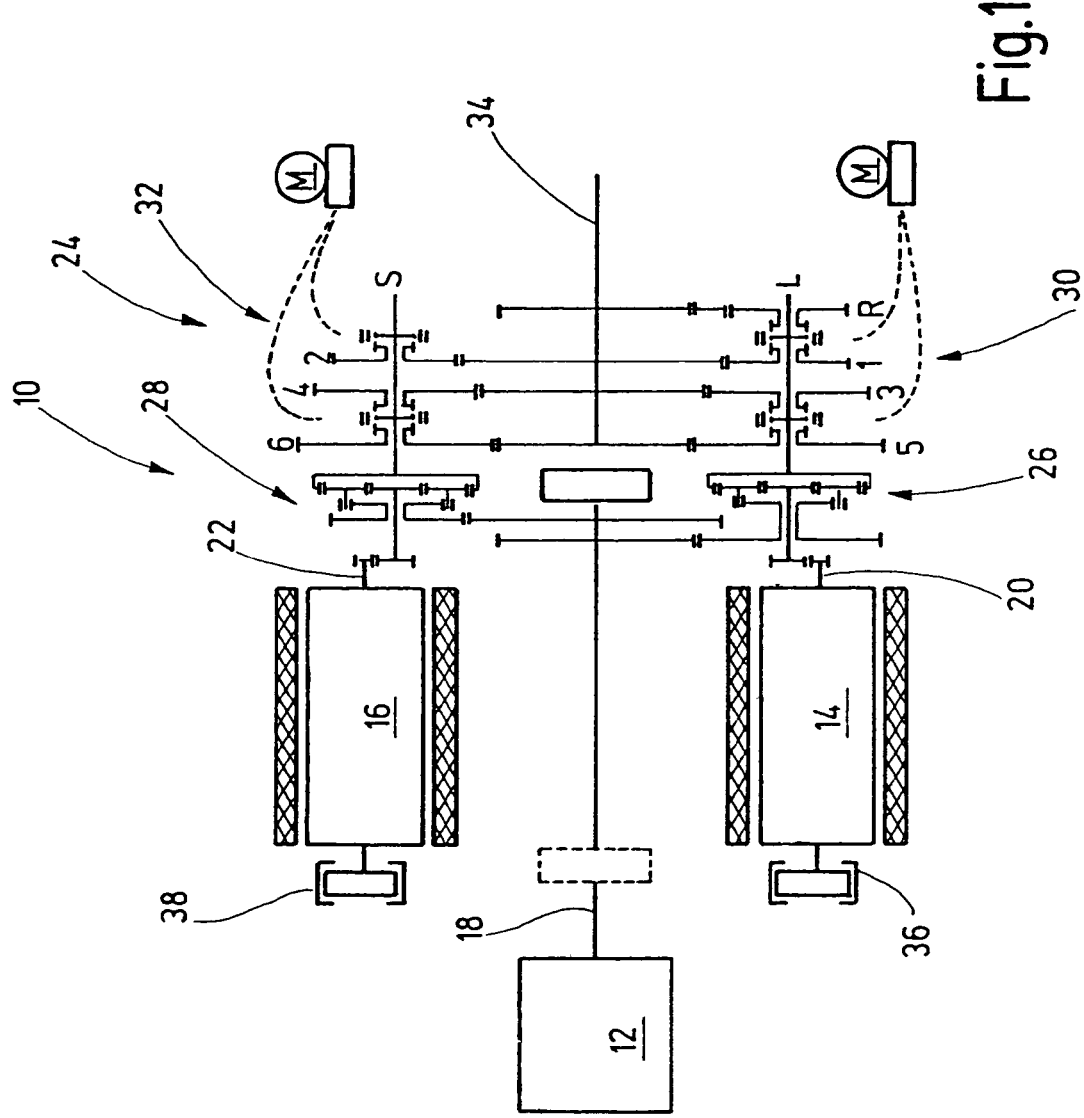
FIG. 1 shows a schematic view of a hybrid drive of a motor vehicle.

FIG. 1 is a schematic illustration of a hybrid drive of a motor vehicle labelled in its entirety with numeral 10.

Hybrid drive 10 includes an internal combustion engine 12 and a first electric motor 14 and a second electric motor 16. A crankshaft 18 of internal combustion engine 12 and drive shafts 20 and 22 of electric motors 14 and 16 are operatively connected to a gearing system 24. Drive shaft 20 is connected to a first planetary gearing 26, and drive shaft 22 is connected to a second planetary gearing 28. A ring gear of planetary gearing 26 is connected to a manual transmission 30, and a ring gear of planetary gearing 28 is connected to a manual transmission 32. Manual transmissions 30 and 32 are in turn operatively connected to an output shaft 34 of gearing system 24. Output shaft 34 is operatively connected to a drive axle of the motor vehicle (not shown).

The design and mode of operation of a hybrid drive 10 of this nature are generally known, so they will not be discussed in further detail within the framework of the present description. In particular, via specific actuation of internal combustion engine 12 and/or electric motors 14 and 16, a different input torque on output shaft 34 may be requested of them. This allows various operating modes of hybrid drive 10 to be set. Via actuation of a shifting mechanism, manual transmissions 30 and 32 enable different gears to be engaged, in known fashion, the gears being labelled in this case as gears 1, 2, 3, 4, 5 and 6, and a reverse gear R. Electric motors 14 and 16 may also each be operated in generator operating mode and serve, e.g., to provide a vehicle system voltage for the motor vehicle and to charge an accumulator (motor vehicle battery). Electric motors 14 and 16 are each associated with braking devices 36 and 38, with which rotors of electric motors 14 and 16 may be mechanically braked.

Figure 2:
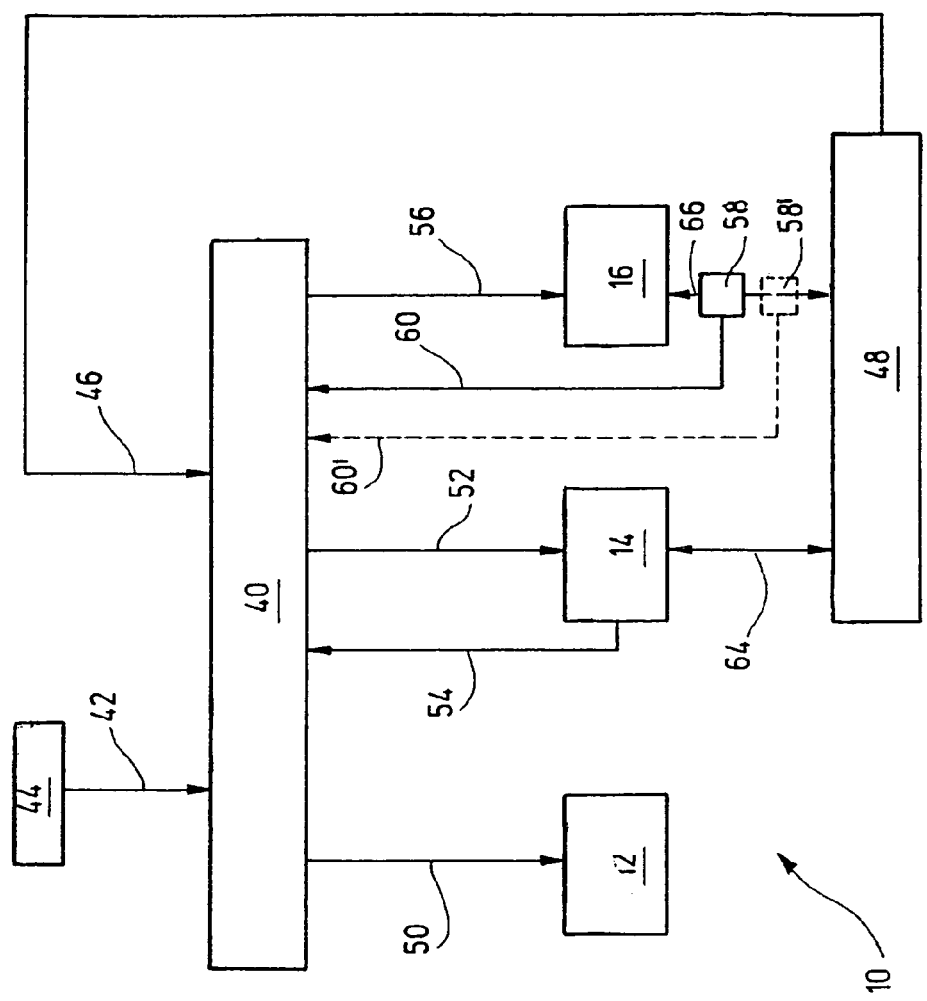
FIG. 2 shows a block diagram of a method for adjusting a setpoint operating state of the hybrid drive.

FIG. 2 shows, in a block diagram, a section of a control unit for actuating hybrid drive 10, whereby the method according to the present invention for adjusting a setpoint operating state of hybrid drive 10 will be discussed here in particular. It is clear that the control unit additionally performs further open- and/or closed-loop control functions.

The control unit includes a "coordinator" 40 for adjusting a setpoint operating point of hybrid drive 10. To this end, coordinator 40 receives a signal 42 from a sensor 44, the signal specifying an instantaneous power demand, i.e., an instantaneous output torque, on drive shaft 34. Sensor 44 is connected to an accelerator pedal, brake pedal, and/or cruise control of the motor vehicle, for example.

Coordinator 40 further receives a signal 46 from a vehicle electrical system 48 of the vehicle, which corresponds to the instantaneous electric power demand of vehicle electrical system 48. Based on signals 42 and 46 and, possibly, further signals that are not shown in the figures, coordinator 40 determines setpoint variables for the drive motors of hybrid drive 10, i.e., for internal combustion engine 12 and electric motors 14 and 16. A first setpoint variable 50 that corresponds to a setpoint torque of internal combustion engine 12 is sent to internal combustion engine 12. A second setpoint variable 52 that corresponds to a setpoint speed of electric motor 14 is sent to electric motor 14. Electric motor 14 has a controller that sets this setpoint speed. Electric motor 14 delivers an actual signal 54 that corresponds to an actual speed of electric motor 14 to coordinator 40. Coordinator 40 thereby detects when the permissible operating range has been exceeded, and it is able to carry out an appropriate correction in the actuation of further assemblies.

By adjusting setpoint speed 52 of electric motor 14, a desired speed of internal combustion engine 12 is simultaneously set. Reference numeral 64 indicates the current with which vehicle electrical system 48 is charged or discharged by electric motor 14. Reference numeral 66 indicates the current with which vehicle electrical system 48 is charged or discharged by electric motor 16.

A further setpoint variable 56; e.g., the setpoint voltage, is supplied to electric motor 16. Electric motor 16 adjusts the voltage in the vehicle electrical system based on setpoint variable 56.

Coordinator 40 selects setpoint variables 50, 52 and 56 in such a manner that the required output torque at output shaft 34 is realized, and the required vehicle system output (signal 46) is made available. The required output torque is calculated based on vehicle speed and the instantaneous power demand (signal 42). It is essential that the vehicle system voltage be coupled via the internal resistance of a vehicle battery to the charging and/or discharging capacity of this battery.

The instantaneous vehicle system voltage is measured by a measurement signal 58 and made available to the coordinator as signal 60.

Instead of measuring element 58, which measures the vehicle system voltage, a measuring element 58' may alternatively be provided, which measures the vehicle system voltage and a current flow in the intermediate voltage circuit between vehicle electrical system 48 and electric motor 16 in combination. As a result, the vehicle system output may be determined directly and made available to coordinator 40 as signal 60'.

It becomes clear that integrating the regulation of the vehicle system voltage in coordinator 40 enables a rapid and exact regulation of the vehicle system voltage to adjust the setpoint operating point of hybrid drive 10. Torque-driven regulation of electric motor 16 is no longer required, thereby eliminating the sources of error associated therewith.

What is claimed is:

1. A method for adjusting a setpoint operating state of a hybrid drive in a vehicle, the hybrid drive having an internal combustion engine and at least two electric motors as drive motors, and the output shafts of the drive motor being operatively connectible to a drive train of the vehicle, a setpoint operating point of the hybrid drive being adjusted as a function of an instantaneous power demand (output torque) on the hybrid drive and an instantaneous electrical power demand of an electrical system of the vehicle, by determining the speeds and the torques of the drive motors,
   wherein at least one of the electric motors (16) is controlled by voltage regulation and the other electric motor(s) (14) is/are controlled by speed regulation.

2. The method as recited in claim 1,
   wherein the charging and/or discharging capacity of a battery of the vehicle is adjusted by regulating the vehicle system voltage.

3. The method as recited in one of the preceding claims, wherein the vehicle electrical system capacity is determined directly by measuring the vehicle system voltage and a current flow in the intermediate voltage circuit between vehicle electrical system (48) and electric motor (16).

* * * * *